Figure 1:
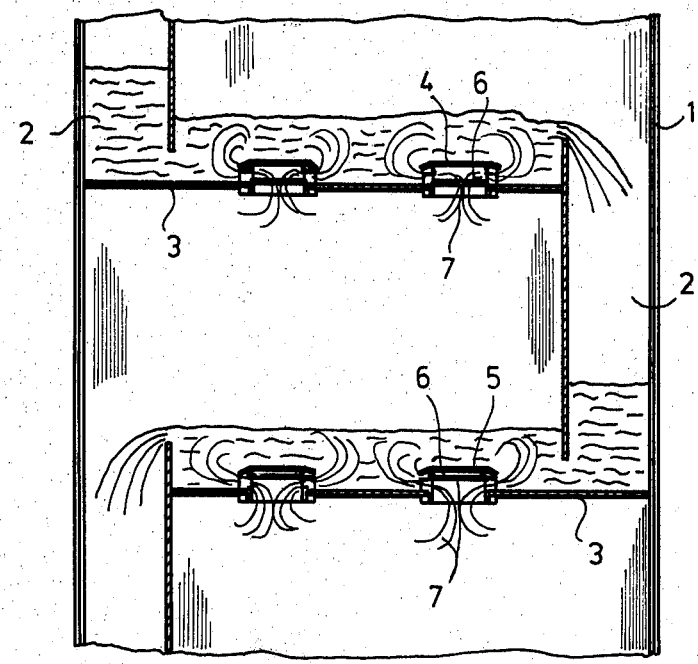

United States Patent [19]

Schramm

[11] 4,290,981
[45] Sep. 22, 1981

[54] EXCHANGER ELEMENT FOR BOTTOMS IN MATERIAL EXCHANGER COLUMNS

[76] Inventor: Arno Schramm, Moselstrasse 23, 6800 Mannheim, Fed. Rep. of Germany

[21] Appl. No.: 107,371

[22] Filed: Dec. 26, 1979

[30] Foreign Application Priority Data

Nov. 8, 1978 [DE] Fed. Rep. of Germany ....... 2848386

[51] Int. Cl.³ ............................................. B01D 3/20
[52] U.S. Cl. ............................................. 261/114 VT
[58] Field of Search ............. 261/114 VT, 114 R, 113

[56] References Cited

U.S. PATENT DOCUMENTS

| | | | |
|---|---|---|---|
| 3,087,711 | 4/1963 | Glitsch | 261/114VT |
| 3,215,414 | 11/1965 | Van't Sant | 261/114 VT |
| 3,325,155 | 6/1967 | Bahout | 261/114 VT |
| 3,491,987 | 1/1970 | Eckert | 261/113 |
| 3,618,913 | 11/1971 | Schramm | 261/114 VT |

FOREIGN PATENT DOCUMENTS 1237299 6/1960 France ......................... 261/114 VT Primary Examiner—Gregory N. Clements
Attorney, Agent, or Firm—Kinzer, Plyer, Dorn & McEachran

[57] ABSTRACT

Exchanger element for the bottoms of an exchanger column comprising a cylinder having grid openings in the side wall, a fixed cover plate at the top of the cylinder for deflecting gas and a movable apertured valve plate inside the cylinder normally covering the opening in the exchanger bottoms.

1 Claim, 9 Drawing Figures

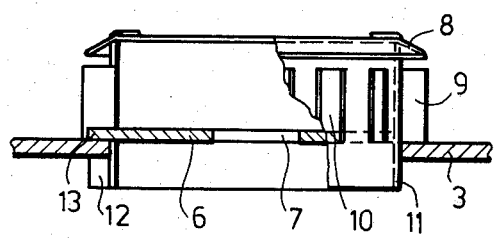
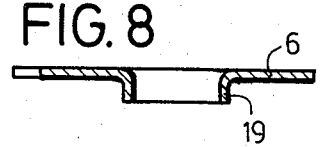
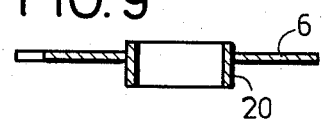
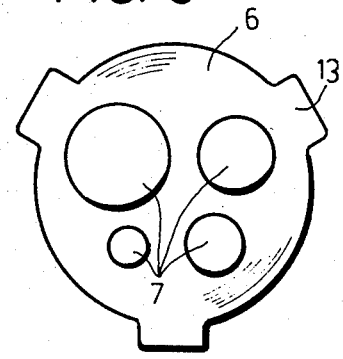
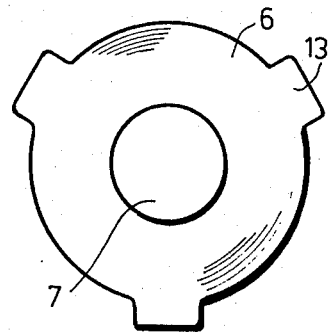
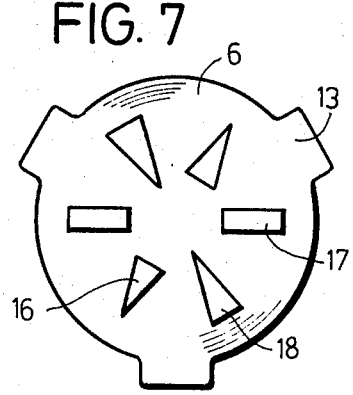
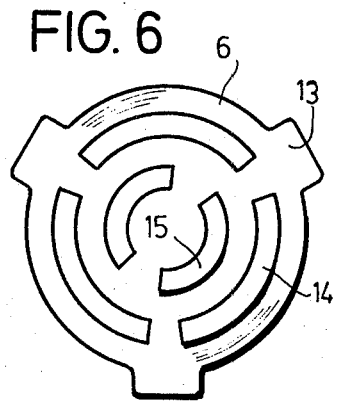

EXCHANGER ELEMENT FOR BOTTOMS IN MATERIAL EXCHANGER COLUMNS

BACKGROUND OF THE INVENTION

The invention relates to an exchanger element for bottoms in material exchanger columns, comprising a cylinder fastened vertically in bottom openings, provided with grid openings for the passage of the gas, with a stationary cover plate for the deflection of the gas, and an inner mobile valve plate, one or several apertures for the widening of the counter-current process, such as rectification, absorption, desorption, gas cooling, gas saturation, etc., which are carried out in so-called columns, and in which the necessary intimate contact between the flowing gas and liquid phases is caused by exchanger bottoms.

These exchanger bottoms essentially consist of apertures (holes) for the gas passage and the so-called liquid shafts for the inlet and/or outlet of the liquid on the bottom.

The so-called screen bottom is the simplest exchanger bottom of this kind. The ascending gas penetrates through perforations in the horizontally arranged bottom panel and through the liquid flowing above the bottom, whereby an exchange of material and heat takes place. The load range of such a screen bottom is limited because already at a slight decrease of the gas load for which gas passage cross-sections were calculated hydraulically, the liquid escapes through the gas passage aperture as a result of the static superpressure, and as a result thereof, the effectiveness of the bottom decreases considerably.

The direct vertical passage of the gas through the liquid is another disadvantage of this exchanger bottom in case of screen bottoms.

So-called valve bottoms are known preponderantly as exchanger bottoms; essentially they consist of circular or oblong covering devices located on apertures in the bottom panel and guided by guide arms which protrude into the bottom aperture and/or are fastened above the bottom panel. In addition to the known mechanical disadvantages, such as considerable wear of the guide arms and/or enlargement of the bottom aperture due to erosion, the capability of adapting to the required maximum and minimum gas loads by opening or closing of the gas passage aperture is another principle drawback.

Investigations have demonstrated that the valves which are mounted for covering the gas aperture of a material exchanger bottom, can adapt only incompletely to the changing gas loads. With partial loads, it is by no means the case that all valves of the bottom adapt by partial opening to the low gas load and even remain in this position. Rather, all the gas passage openings of the bottom remain closed under partial load by the valve covers until the pressure of the gas beneath the bottom has risen so far that suddenly part of the bottom apertures will be released by lifting of the valve covers. These valve covers open as far as the maximum stop and then they also remain in this maximum opening position. However, commensurate with the partial load of the gas the opened gas passage openings only represent part of the total openings present in the bottom. True, in this bottom part the liquid will be attacked by the gas and thus an exchange of material will come to pass, however, only very incompletely, for simultaneously with the opening of part of the gas passage opening on the bottom and passage of the entire gas current available, the gas pressure prevailing beneath the remaining gas passage openings is eliminated, although the related openings are covered by valve plates. Because for corrosion and hydraulic reasons the valve plates never shall nor can seal the gas passage openings in the bottom completely, the liquid flowing there above the bottom dribbles off, so that soon the bottom will run idly and thus the entire column will reach the point of failure.

Consequently, the invention is based on the problem of creating an exchanger element for material exchanger bottoms which to a large extent adapts to the changing gas loads without the gasification of the fluid and thus improving the degree of bottom effectiveness.

THE PRESENT INVENTION, ITS OBJECTS AND ADVANTAGES

According to the invention this problem is solved in that the valve plate is equipped with openings of identical or different size shaped best for the passage of the gas.

This results in the essential advantage that the gas passage openings are covered by corresponding devices which on the one hand adapt to the changing gas load by more or less sealing the free gas passage surface and on the other hand they still are designed in such a manner that they deflect the gas which passed through the bottom opening during the introduction of the fluid, returning back toward the bottom panel.

Thereby it again is advantageous that the inner valve plate adheres under a partial load of the gas on the bottom opening within the vertical cylinder and seals the bottom opening. The gas merely flows through the opening or openings in the valve plate which are laid out according to rules of the hydraulics, and is deflected through the cover plate, and enters through the grid openings of the vertical cylinder for gasification, into the liquid, that is to say the liquid is gasified under partial load in the same manner by the exchanger element as with completely opened inner valve plate, except that commensurate with the lower gas charge available the entire gas passage openings in the bottom are exposed only partly by the openings in the valve plate.

Another advantage of the contemplated embodiment of the exchanger elements according to the invention is demonstrated under increasing gas load. Caused by the openings in the valve plates, it does not open suddenly as far as the upper stop point of the gas passage openings in the bottom and/or in the vertical cylinder. Rather, it remains in a corresponding altitude position and thus only exposes the opening corresponding to the gas load. That way the entire bottom surface is gased and the oozing out of the liquid is avoided, which is tantamount with an unchanging high degree of effectiveness, even under a partial charging by the gas.

Another advantage of the contemplated embodiment of the exchanger elements according to the invention shall be shown in the following layout example:

The following criteria are important for the dimensioning of an exchanger column:

(1) gas and liquid load with the corresponding densities;

(2) load range, that is lower and upper load limit, and (3) admissible maximum pressure loss.

The liquid load is important preponderantly for the determination of the liquid feed and discharge ducts of the exchanger bottom. Since these bottom devices are not influenced by the proposed invention and also are dimensioned identically for all forms of exchanger bottoms, the following considerations shall be explained further disregarding the liquid charge.

A quite definite number of exchanger elements per bottom is necessary to achieve a required manimum gas charge throughout a column. Each exchanger element and thus each exchanger bottom has a certain pressure drop the gas experiences upon passing through the element (and also the liquid layer, which, however, is assumed as being identical for all kinds of bottoms and thus is disregarded). This pressure loss is a function of the flowing amount of gas and dependent on the constructive design of the exchanger element; with a predetermined constructive design, that is on the specific gas load of an exchanger element; the higher the gas load, the higher the pressure loss.

If now for process-technical reasons the pressure loss of an exchanger element is limited, this means that the specific gas charge/exchanger element must be reduced, that is the number of exchanger elements/bottom must be increased.

However, based on the required lower load limit, the number of the exchanger elements/bottom cannot be increased at will, because as the gas load per exchanger element drops below a certain minimum, the liquid escapes through the exchanger elements and the degree of effectiveness of the bottom then drops sharply, and/or the bottom lose its function completely.

All exchanger bottoms presently on the market have a gas charge range of approximately 1:3.

As a result of the proposed embodiment of the exchanger elements according to the invention, a load range of at least 1:8 is achieved, because the lower load limit, that is the load point at which the bottom still operates satisfactorily commensurate with the problem to be solved, could be expanded downward quite substantially. Considerable advantages result thereby for the layout and the operation of exchanger columns:

(1) The columns can be adjusted precisely to the required load range and the pre-determined gas charge at maximum admissible pressure loss, a fact which is of considerable significance under today's changing capacities of chemical facilities and which leads to corresponding savings in costs, because for example at the prevailing partial charging of the columns no additional energy need to be mustered for supplementary evaporation in order to maintain the bottom operative at all, which, nevertheless, represents a loss with respect to product yield.

(2) For columns which operate under vacuum because of process-engineering reasons the admissible pressure loss per exchanger bottom is reduced dramatically, that is for the pre-determined maximum gas load a corresponding number of exchanger elements is necessary with correspondingly low specific element load. Naturally, that way the lower load limit of the bottom is shifted very dramatically upward, that is into the proximity of the upper load range of the column.

Since thus the adjustment of the column to changing capacity of the facilities no longer exist, these columns in a usual manner must be equipped with considerably costly devices which better meet the demanded requirements. However, with the advantages of the proposed design of the exchanger elements it is possible to equip the columns with cheaper exchanger bottoms.

IN THE DRAWING

Figure 2:
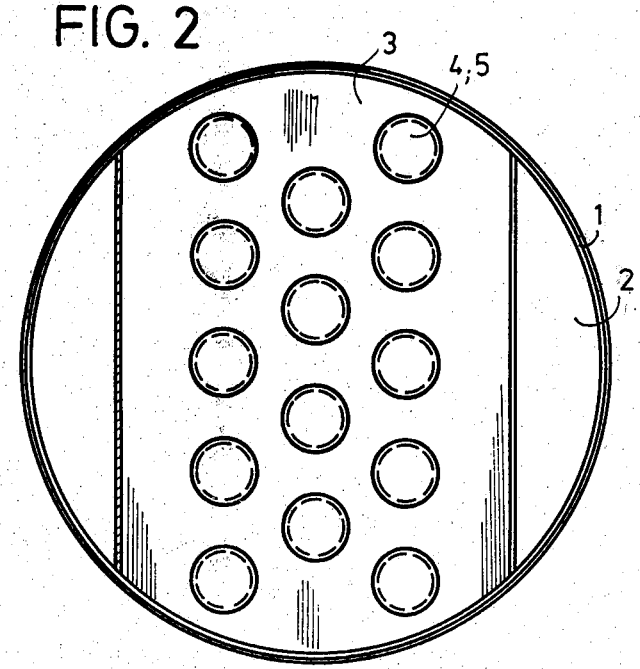

Below the invention shall be explained in greater detail by way of the embodiments exemplified in the drawings:

FIG. 1 represents a partial sectional view of an exhanger column with the exchanger bottoms according to the invention, FIG. 2 shows a top view upon an exchanger bottom, FIG. 3 shows a sectional view of one embodiment of an exchanger element according to the invention, FIGS. 4 to 7 show top views of additional embodiments of the inner valve plate, and FIGS. 8 and 9 are sectional views of valve plates with thickened opening, applicable equally for all the embodiments exemplified in FIG. 4 to FIG. 7.

DESCRIPTION OF THE PRESENT INVENTION

The exchanger bottoms 3 are in communication through a drainage duct 2 and exchanger elements 4 and 5 in the column jacket 1 which as a rule is cylindrical in shape. In FIG. 1 the exchanger element 4 shows the function under partial load of the gas. The inner valve plate 6 adheres and seals the bottom aperture. The gas merely flows through the aperture 7 in the valve plate 6 into the exchanger element 4 and is introduced into the liquid like with full load, that is to say it is deflected and distributed therein, and is entrained in the liquid which flows for example transversely over the bottom from the infeed to the discharge shaft.

In the same FIG. 1 the exchanger element 5 shows the function under full load of the gas, that is the inner valve plate 6 is lifted completely and engages the upper bordering edge of the element. The entire bottom opening at 5 is exposed for the gas passage.

FIG. 3 shows the sectional view of an exchanger element consisting of a vertical cylinder 11 with grid openings 10 in the side wall, said cylinder being inserted into the opening of the bottom 3 and fastened in the bottom by outwardly bent fastening lugs 12.

The cover plate 8 forms the upper seal of the exchanger element. Said plate causes the deflection of the gas within the exchanger element which is necessary for the distribution of the gas and thus a good degree of effectiveness even under partial load. The gas is introduced through the guide vanes 9 at the grid apertures 10 into the liquid.

The inner valve plate 6 is guided in each case with three guide straps 13 in apertures 10 of the vertical cylinder of the exchanger element. This completely eliminates a rotation of the valve plate.

The apertures 7, 14, 15, 16, 17, 18 are dimensioned for the predetermined layout criteria, whereby for the most favorable adjustment to the required load conditions, pressure loss and load range, the proposed shapes are available. By lateral arrangement of these apertures in the valve plate 6 the gas is introduced unilaterally into the liquid whereby the latter can be accelerated or decelerated in the cross-current above the bottom.

FIGS. 8 and 9 demonstrate the possible thickenings 19 and 20 of the interior valve plate 6. With these contemplated thickenings the inflow relations of the gas into the exchanger element are improved, which is demonstrated by a low inflow pressure loss.

I claim:

1. An exchanger element for bottoms in material exchanger columns, comprising a cylinder fixed vertically in a bottoms opening, said cylinder having a vertical side wall provided with grid openings (10) for the passage of gas, said cylinder supporting a stationary cover plate (8) having a closed top for the deflection of the gas out through the grid openings and including an inner mobile valve plate (6) beneath the cover plate, said valve plate being equipped with one or more apertures allowing flow of gas therethrough, said grid openings being wholly above the bottoms to cooperate with the valve plate in regulating the volume of gas flow, said valve plate having guide straps (13) guidably mounted in selected of the grid openings, and said grid openings being defined by radially directed guide vanes (9).

* * * * *